2,760,908

PROCESS FOR REMOVING ALKYL SULFIDES FROM HYDROCARBON FLUIDS WITH ADSORBENT IMPREGNATED WITH CUPROUS CHLORIDE

Martin R. Cines, Knoxville, Tenn., and James T. Roach, Bartlesville, Okla., assignors to Phillips Petroleum Company, a corporation of Delaware No Drawing. Application November 2, 1951, Serial No. 254,654

6 Claims. (Cl. 196—30)

This invention relates to an improved reagent and a process for removing alkyl sulfides from admixture with hydrocarbons. In one aspect it relates to a process for removing dialkyl sulfide sulfur from such hydrocarbon liquids as gasoline, naphtha, etc.

An object of our invention is to provide an improved reagent for use in the desulfurizing of sulfur containing hydrocarbons.

Another object of our invention is to provide a process for the desulfurizing of hydrocarbon mixtures containing sulfur in the form of dialkyl sulfides.

Still another object of our invention is to devise an improved reagent and a process utilizing this reagent in removing difficultly removable dialkyl sulfide sulfur from hydrocarbon mixtures containing same.

Still other objects and advantages of our invention will be realized upon reading the following description.

Among the sulfur compounds generally found in hydrocarbon mixtures may be listed hydrogen sulfide, mercaptans, dialkyl sulfides, dialkyl disulfides, thiophenes and thiophanes. The kind and the amount of these compounds found in hydrocarbon mixtures depend not only on the source of the hydrocarbon raw material but also on the manufacturing and processing methods to which the raw material has been subjected, for example, sweeting processes convert mercaptans to dialkyl disulfides and cracking processes convert some organic sulfur compounds to other organic sulfur compounds, hydrogen sulfide and hydrocarbons.

The dialkyl sulfides, hereinafter termed alkyl sulfides, are markedly resistant to oxidation and accordingly are not affected by the reagents of the various sweeting processes, that is, by processes which oxidize mercaptans to the corresponding disulfides. It has been found however that many sulfur bearing hydrocarbon mixtures can be desulfurized to varying degrees by treatment with such adsorbents as silica gel since certain adsorbents have the ability to remove at least partially certain sulfur compounds by selective adsorption. Included in the various sulfur compounds adsorbed by silica gel are the alkyl sulfides (Ind. Eng. Chem. 19, 1249, (1927)). Another method for the removal of alkyl sulfides, utilizes reaction with anhydrous cupric chloride in the complete absence of water, including water of crystallization, to form apparently a type of addition compound which is insoluble in hydrocarbon oils. This cupric chloride reagent may be the solid compound alone or carried on an adsorbent carrier from which all of the water of solution and crystallization has been removed, that is, the carrier and the cupric chloride reagent are anhydrous or substantially so.

We have discovered that the removal of alkyl sulfides from sulfur-bearing hydrocarbon mixtures by adsorption on a silica gel adsorbent is markedly improved by treatment or washing of the adsorbent silica gel with a dilute aqueous solution of hydrochloric or sulfurous acids. Such an acid treated adsorbent may be subjected to a drying treatment to remove uncombined or free moisture and then used directly for removal of the alkyl sulfide or it may be treated with a solution and/or suspension of cupric or cuprous chloride to form a copper chloride-impregnated acid-treated adsorbent which is then dried to remove free or uncombined moisture prior to use in our desulfurizing process. The copper chloride-impregnated acid-treated adsorbent is found to be a distinct improvement over the acid-treated adsorbent by itself, however the acid-treated adsorbent is still an improvement over the sulfur removal adsorbents of the prior art.

Although we believe the removal of alkyl sulfides by the acid-treated adsorbent silica gel to be an adsorption process and we will herein discuss it as such, we are not certain of the exact mechanism and do not wish to have our invention so limited. In the same manner the copper chloride-impregnated adsorbent may involve either adsorption, chemical reaction or a combination of these.

The adsorbent to be used in the practice of our invention is readily prepared by agitating silicic acid with a dilute solution of either hydrochloric acid or sulfurous acid, for example, 3-normal hydrochloric acid, for a period of about 30 minutes at atmospheric temperature conditions and then separating the acid-treated gel from the solution by filtration and drying for from 16 to 24 hours at 110° C. In the preparation of the impregnated adsorbent the acid-treated gel is agitated with a solution and/or suspension containing cupric or cuprous chloride at room temperature for a suitable period of time to obtain a desired concentration of copper salt in the finished reagent before separation of the gel by filtration and drying in accordance with the above mentioned procedure. The impregnated adsorbents do not need to be treated with acid prior to impregnation with the copper salt but the copper salt may be dissolved and/or suspended in the acid solution and the silica gel agitated with this solution. The conditions of treating the gel in accordance with our invention do not appear to be critical as long as concentrations are sufficiently dilute to secure an even distribution of the acid and copper chloride on the gel. While a 30 minute period was mentioned as a satisfactory period of time for agitating the gel with 3-normal hydrochloric acid shorter periods of time as well as longer periods of time are satisfactory. From 16 to 24 hours were mentioned as being satisfactory drying at 100° C. These time limits may be varied considerably both shorter than 16 hours and longer than 24 hours and yet produce an effective sulfur removing reagent.

The desulfurizing treatment of the sulfur bearing hydrocarbon mixture with our reagent comprises merely contacting the reagent with the organic sulfide sulfur-bearing hydrocarbon in either a simple solid-liquid batch treating operation or in a percolation column as a continuous or semi-continuous process. The temperatures of treatment are preferably ordinary atmospheric temperatures, for example between 60 and 100° F. and pressures are merely sufficient to maintain liquid phase operation. Temperatures lower than 60° F. may be used as for example, in cold winter time, and temperatures even higher than 100° F. may aslo be used for example, in warm summer weather. When operating at higher temperatures, sufficient pressure must be applied to the operation to maintain liquid phase operation.

*Specific examples*

In the following examples approximately 70 parts by weight of a sulfur-bearing hydrocarbon mixture containing about 0.7 per cent by weight of sulfur as ethylsulfide in methylcyclohexane were contacted in a batch operation at room temperature with approximately 29 parts by weight of a prepared treating agent for about one-half hour. In each of the runs 23 parts by weight of silica gel were agitated with about 200 parts by weight of 3-normal hydrochloric acid or sulfurous acid of 1.5 pH and where indicated, impregnated with a solution and/or suspension containing 6 parts by weight of cuprous chloride or cupric chloride. The sulfur contents of the prepared sulfur-bearing hydrocarbon mixture and the treated hydrocarbon were determined by the standard lamp sulfur method.

| Run No. | Adsorbent | Sulfur Content of Recovered Hydrocarbon, weight percent |
|---|---|---|
| 1 | Untreated silica gel | 0.194 |
| 2 | HCl treated silica gel | 0.119 |
| 3 | $H_2SO_3$ treated silica gel | 0.063 |
| 4 | HCl treated silica gel impregnated with $CuCl_2$ | 0.013 |
| 5 | $H_2SO_3$ treated silica gel impregnated with $CuCl_2$ | 0.020 |
| 6 | HCl treated silica gel impregnated with CuCl | 0.011 |
| 7 | $H_2SO_3$ treated silica gel impregnated with CuCl | 0.000 |

From the above given runs using our reagent and our method of treating a sulfide sulfur containing hydrocarbon it should be noted that while the use of an untreated silica gel adsorbent effects a considerable sulfur removal, the use of our reagents effects still greater sulfur removals. It is a relatively simple matter to remove some sulfur from a hydrocarbon stock containing an appreciable amount of sulfur. It is very difficult to remove a last trace of sulfur from a given stock. In Run 7 it should be noted that the silica gel reagent treated with sulfurous acid and impregnated with cuprous chloride removed all of the sulfur and accordingly yielded a treated hydrocarbon product containing 0 per cent sulfur. It should be borne in mind however that our process is applicable to the separation of dialkyl sulfide sulfur from hydrocarbons and this Run No. 7 is exemplary of our reagent and process for the removal of ethyl sulfide from the hydrocarbon methylcyclohexane. A cuprous chloride impregnated silica gel washed with hydrochloric acid yielded a treated hydrocarbon stock according to Run No. 6 containing only 0.011 per cent by weight of sulfur. The use of cupric chloride for impregnating acid washed silica gel, in general, does not give quite as great sulfur removal as when cuprous chloride is used. It may be in the cupric chloride reagent that at least some of the cupric chloride has been reduced to cuprous chloride when the silica gel adsorbent is treated in its preparation with a sulfurous acid solution or suspension of cupric chloride since sulfurous acid is generally considered an excellent reducing agent.

Whether the reagent contains all cuprous chloride or part cuprous chloride and part cupric chloride is immaterial but we find that more efficient sulfur reduction is obtained when the reagent contains an appreciable amount of cuprous chloride.

Other cupric or cuprous salts such as cuprous or cupric acetates, formate, bromide or such other salts as will provide preferably some cuprous ion in an impregnated condition with the silica gel adsorbent. We prefer however to use cupric or cuprous chloride since the use of these reagents is in general the more economical. In like manner some other mineral acids may be used for acid washing the silica gel as for example sulfuric acid, but we prefer to use either hydrochloric acid or sulfurous acid. Hydrobromic acid can be used with the same general result as when hydrochloric acid is used. We believe however that the general superiority of the sulfurous acid for washing of the silica gel is linked with its general reducing property in assuring the presence of at least an effective amount of the copper salt in its cuprous form.

While we have described our invention relative to the separation of diethyl sulfide sulfur from methylcyclohexane, the sulfur content from other dialkyl sulfides such as would be present in straight run, reformed or cracked hydrocarbon stocks may be removed or markedly reduced from such stocks by use of our reagents according to the method described herein.

While silica gel has been exposed to the presence of acid in its preparation, that exposure to acid is not the equivalent of our acid wash since by use of our acid wash as disclosed herein, the sulfur removing ability of the gel is markedly improved. Why our washing operation should so improve the gel for sulfide sulfur removal from hydrocarbons we do not definitely know.

While the above described method of reagent preparation and operational process are given for illustrative purposes only the invention obviously is not limited thereto.

We claim:

1. A method for removing a dialkyl sulfide from a liquid phase admixture with a hydrocarbon comprising contacting at substantially atmosphheric temperature a liquid phase admixture of a hydrocarbon and a dialkyl sulfide with a reagent consisting of adsorbent silica gel previously impregnated with a copper chloride and washed with a dilute aqueous mineral acid selected from the group consisting of hydrochloric acid and sulfurous acid under liquid phase conditions and dried, separating the hydrocarbon from the so prepared silica gel as the product of the process.

2. A method for removing a dialkyl sulfide from a liquid phase admixture with a hydrocarbon comprising contacting at atmospheric temperature a liquid phase admixture of a hydrocarbon and a dialkyl sulfide with a reagent consisting of adsorbent silica gel previously impregnated with a copper chloride and washed with a dilute aqueous mineral acid selected from the group consisting of hydrochloric acid and sulfurous acid under liquid phase and at atmospheric temperature conditions and dried, and separating the hydrocarbon from the so prepared silica gel as the product of the process.

3. A method for removing dialkyl sulfide sulfur from a liquid phase admixture with hydrocarbons comprising contacting at substantially atmospheric temperature a liquid phase admixture of hydrocarbons and dialkyl sulfides under liquid phase conditions with a reagent consisting of adsorbent silica gel previously washed with a dilute aqueous mineral acid selected from the group consisting of hydrochloric and sulfurous acids and impregnated with a copper chloride and dried, separating the hydrocarbons from the silica gel as the so prepared product of the process.

4. A method for removing dialkyl sulfide sulfur from a liquid phase admixture with hydrocarbons comprising contacting at substantially atmospheric temperature under liquid phase conditions a liquid phase admixture of hydrocarbons and dialkyl sulfide sulfur with a reagent consisting of adsorbent silica gel previously washed with a dilute aqueous solution of hydrochloric acid and impregnated with cupric chloride and dried, and separating the hydrocarbons from the so prepared silica gel as the product of the process.

5. A method for removing dialkyl sulfide sulfur from a liquid phase admixture with hydrocarbons comprising contacting at substantially atmospheric temperature under liquid phase conditions a liquid phase admixture of hydrocarbons and dialkyl sulfide sulfur with adsorbent silica gel previously washed with a dilute aqueous solution of sulfurous acid, impregnated with cuprous chloride and dried, and separating the hydrocarbons from the so prepared silica gel as the product of the process.

6. A method for removing a dialkyl sulfide from a liquid phase admixture with a hydrocarbon comprising contacting at substantially atmospheric temperature a liquid phase admixture of a hydrocarbon and a dialkyl sulfide with a reagent consisting of adsorbent silica gel previously impregnated with a copper salt selected from the group of copper salts consisting of cuprous chloride, cupric chloride, cuprous bromide, cupric bromide, cuprous formate, cupric formate, cuprous acetate and cupric acetate and washed with a dilute aqueous mineral acid selected from the group consisting of hydrochloric acid and sulfurous acid under liquid phase conditions and dried, separating the hydrocarbon from the so prepared silica gel as the product of the process.

References Cited in the file of this patent

UNITED STATES PATENTS

| | | |
|---|---|---|
| 1,739,305 | Hildritch | Dec. 10, 1929 |
| 1,773,273 | Miller | Aug. 19, 1930 |
| 1,815,563 | Henderson | July 21, 1931 |
| 1,823,865 | Swallen | Sept. 15, 1931 |
| 2,020,411 | Greer | Nov. 12, 1935 |
| 2,042,053 | Hoover | May 26, 1936 |
| 2,114,123 | Heuser | Apr. 12, 1938 |
| 2,436,125 | Spence et al. | Feb. 17, 1948 |
| 2,481,825 | Connolly | Sept. 13, 1949 |
| 2,483,868 | Archer et al. | Oct. 4, 1949 |